Patented Dec. 31, 1946

2,413,615

UNITED STATES PATENT OFFICE 2,413,615

NICOTINIC ACID PROCESSES

Sidney W. Fox, Ann Arbor, Mich., assignor to The Upjohn Company, Kalamazoo, Mich.

No Drawing. Application September 4, 1942, Serial No. 457,313

8 Claims. (Cl. 260—295)

This invention relates to improvements in nicotinic acid processes.

This invention relates to the production of nicotinic acid and derivatives thereof such as the esters and amides thereof. It has for its objects:

First, to provide a new and improved method of producing said substances.

Second, to provide such a method of producing these substances from trigonelline or the salts thereof.

Third, to provide such a method which is inexpensive and which produces significant yields of the final products from trigonelline or its salts.

Fourth, to provide such a method which is particularly adapted to commercial applications.

Other objects and advantages pertaining to details and economies will appear from the description to follow. The invention is defined in the claims.

In carrying out my method, I use as a starting material either trigonelline or a salt of trigonelline such as the acid sulphate or the hydrochloride or any other available salt. I demethylate the trigonelline or its salt by reacting it in the presence of a catalyst selected from the group consisting of ionic zinc and ionic gold with ammonium ions and halide ions and I prefer to have hydrogen ions also present.

The ammonium ions are obtained from ammonium salts which are admixed with trigonelline or its salt and I prefer to use ammonium halides. I have found that ammonium bromide gives the highest yield of the final product.

The halide ions may come from the ammonium halide, but I have found that most satisfactory results are obtained if a halogen acid is employed. I prefer to use hydrobromic acid which gives the most satisfactory yields when it is used in combination with ammonium bromide.

The hydrogen ions may come from water or from acid, particularly the halogen acids. I have found that best results are obtained when the hydrogen ions are obtained from the halogen acids since higher yields are obtained when they are employed.

The ionic zinc and ionic gold employed as a catalyst may come from zinc sulphate, zinc chloride or gold chloride. I have found that the reaction will proceed without the addition of the catalytic metallic ions, but the higher yields are obtained when they are employed.

I apply heat to the reaction mass with a bath and have found that if the bath temperature is at approximately 350° C. the best yields are obtained. The reaction takes place most completely when this temperature is applied to the reaction mass and there is no objectionable production of decomposition products which a higher degree of heat would tend to produce.

I have found that the most satisfactory results can be obtained by starting the reaction mass at room temperature and bringing the heat up to 350° C. after which the application of heat is stopped. The amount of time consumed in this operation is approximately 20–60 minutes. This produces a minimum of decomposition products and gives very satisfactory yields.

After the reaction has taken place and the demethylation is completed, I permit the mixture to cool down to room temperature. Thereafter I esterify by adding an excess of alcohol. For the methyl ester, I use methanol, for the ethyl ester, I use ethyl alcohol, and similarly employ the desired alcohol for the desired ester.

I permit the solution to cool before adding the alcohol to prevent its loss by evaporation. After the alcohol is added, I reflux the entire mass at a temperature substantially that of the boiling point of the alcohol employed for two hours while passing dry HCl gas through the reflux mixture in sufficient quantities to assure saturation by the end of the refluxing period.

The resultant suspension is chilled to precipitate solids therefrom. I prefer to carry the chilling to approximately 0° C. to complete the precipitation.

The chilling is followed by a filtration and the resultant filtrate is concentrated to a syrup. This syrup is taken up with water and alkalized with sodium carbonate. The ester of nicotinic acid is then extracted from the water solution with benzene or some other organic solvent which is immiscible with water. Suitable solvents are ethyl ether or toluene. The benzene fraction is then either fractionated or evaporated to dryness in the case of methyl nicotinate, or fractionated in the case of the liquid esters in order to obtain the pure ester.

The esters may be converted to the amides of nicotinic acid by using alcoholic ammonia in the case of nicotinic acid amide.

The esters may be converted to nicotinic acid by saponification followed by a neutralization of the resulting solution, evaporation of the water, and extraction of the nicotinic acid from the salt formed by the neutralization with alcohol.

I have also found that nicotinic acid or esters thereof can be obtained by converting trigonelline to trigonelline hydrochloride and by heating an aqueous solution of the hydrochloride in a bath having a temperature of 350° C. Nicotinic acid is produced by this step which demethylates the trigonelline. The nicotinic acid may be separated in any suitable manner. It is possible to esterify it with an alcohol and to separate the ester from the reaction mass.

The trigonelline may be converted to the hydrochloride by treating it with hydrochloric acid. The reaction mass may then be heated. It is possible also to merely dissolve trigonelline hydrochloride in aqueous solution and to apply the heat thereto to accomplish the demethylation. These reactions may be carried out at atmospheric pressure.

The following are typical examples of my invention:

Example I.—10 g. of trigonelline acid sulphate, 15 g. of ammonium bromide, 1 g. of zinc sulphate, and 25 cc. of 48% HBr solution are placed in a suitable vessel in a bath. The temperature of the bath is raised from room temperature to 350° C. in a period of about 30 minutes.

The resulting mixture is cooled and 100 cc. of dry methanol are added. The mixture is refluxed for two hours while dry HCl gas is passed through it in such quantities that by the end of the two hours the mixture is saturated with HCl. The resulting suspension is then chilled to 0° C. and is filtered. The resulting filtrate is concentrated to a syrup. This syrup is taken up in about 10–20 cc. of water and alkalized with sodium carbonate until carbon dioxide evolution ceases. The ester of nicotinic acid is extracted from this solution by benzene. The benzene is evaporated, leaving crystalline methyl nicotinate.

In this method approximately 40% of the trigonelline is converted to the nicotinic acid and recovered. Before the esterification approximately 65% of the trigonelline is converted to the nicotinic acid.

Exampe II.—2 g. of trigonelline acid sulphate, 4 g. of ammonium bromide, 10 cc. of water, and 10 cc. of 48% HBr solution are heated in a flask in a bath which is brought to 350° C. over 30 minutes. The resultant yield of nicotinic acid is approximately 50%.

The resultant reaction mass may be esterified as in Example I and the ester extracted.

Example III.—1 g. of trigonelline acid sulphate, 2 g. of ammonium chloride, 5 cc. of water are mixed in a flask and heated in a bath, the temperature of which is raised from room temperature to 350° C. over a period of 30 minutes at which time the application of heat is stopped. In this case the yield of nicotinic acid is approximately 40% of the trigonelline.

The product after the demethylation step may be treated as above by esterification and extraction of the ester.

Example IV.—1 g. of trigonelline acid sulphate, 2 g. of ammonium chloride, and 5 cc. concentrated HCl solution are mixed in a flask and heated in a bath, the temperature of which is raised from room temperature to 350° C. over a period of 30 minutes, at which time the application of heat is stopped. In this case the yield of nicotinic acid is approximately 20% of the trigonelline.

The product after the demethylation step may be treated as above by esterification and extraction of the ester.

Example V.—1 g. of trigonelline acid sulphate, 2 g. of ammonium chloride, .125 g. zinc sulphate, and 5 cc. of water are mixed in a flask and heated in a bath, the temperature of which is raised from room temperature to 350° C. over a period of 30 minutes, at which time the application of heat is stopped. In this case the yield of nicotinic acid is approximately 35% of the trigonelline.

Example VI.—1 g. of trigonelline hydrochloride in aqueous solution is placed in a bath. The bath temperature is raised from room temperature to 350° C. over 10–30 minutes. When the temperature reaches 350° C. the application of heat is discontinued. Demethyation of the trigonelline has already occurred.

The nicotinic acid may be extracted as in the above examples by esterifying with an alcohol and extracting the ester.

The product after the demethylation step may be treated as above by esterification and extraction of the ester.

In addition to the above specific materials, others may be used in molecular proportions. In place of the HBr and HCl, HI may be used. In case HI is employed, the reaction should be carried out in an atmosphere of inert gas such as nitrogen or carbon dioxide.

In place of the zinc sulphate, zinc chloride or gold chloride can be employed.

In place of the ammonium bromide and ammonium chloride, ammonium iodide may be employed. In cases where a halogen acid is employed, ammonium sulphate may be employed.

My invention may be employed on a commercial scale and the yields are sufficiently high and the process is sufficiently inexpensive to make it thoroughly practical.

The terms and expressions which have been herein employed are used as terms of description and not of limitation, and there is no intention, in the use of such terms and expressions, of excluding any equivalents of the features shown and described. It is recognized that various modifications are possible within the scope of the invention claimed.

Having thus described my invention, what I claim as new and desire to secure by Letters Patent is:

1. In the method of producing a substance from the group consisting of a salt of nicotinic acid and nicotinic acid, the steps of reacting a trigonelline salt with an ammonium salt, and a halogen acid with the application of heat.

2. In the method of producing a substance from the group consisting of nicotinic acid and a salt of nicotinic acid, the step of reacting a trigonelline salt with an ammonium salt, a halogen acid and a catalyst selected from the group consisting of ionic zinc and ionic gold with the application of heat at approximately 350° C.

3. In the method of producing a substance from the group consisting of nicotinic acid and a salt of nicotinic acid, the step of reacting a trigonelline salt with an ammonium salt, a halogen acid and a catalyst selected from the group consisting of ionic zinc and ionic gold with the application of heat.

4. In the method of producing a substance from the group consisting of nicotinic acid and a salt of nicotinic acid, the step of reacting a trigonelline salt with an ammonium salt, and a halogen acid with the application of heat at approximately 350° C.

5. In the method of producing a substance from the group consisting of a salt of nicotinic acid and nicotinic acid, the steps of reacting a trigonelline salt with an ammonium halide, a halogen acid and a catalyst selected from the group consisting of ionic zinc and ionic gold with the application of heat at approximately 350° C.

6. In the method of producing a substance from the group consisting of a salt of nicotinic acid and nicotinic acid, the steps of reacting a trigonelline salt with an ammonium halide, a halogen acid and a catalyst selected from the group consisting of ionic zinc and ionic gold with the application of heat.

7. In the method of producing a substance from the group consisting of nicotinic acid and a salt of nicotinic acid, the step of reacting a trigonelline salt with an ammonium halide, with the application of heat to approximately 350° C.

8. In the method of producing a substance from the group consisting of a salt of nicotinic acid and nicotinic acid, the steps of reacting a trigonelline salt with ammonium bromide, hydrobromic acid and a catalyst selected from the group consisting of ionic zinc and ionic gold with the application of heat at approximately 350° C.

SIDNEY W. FOX.